June 7, 1966 G. BEHRMANN 3,254,734
COLLAPSIBLE AUTOMOTIVE VEHICLE
Filed May 16, 1963 7 Sheets-Sheet 2

INVENTOR
Georg Behrmann
Karl F. Ross
BY
Agent

Fig. 3

June 7, 1966  G. BEHRMANN  3,254,734
COLLAPSIBLE AUTOMOTIVE VEHICLE
Filed May 16, 1963  7 Sheets-Sheet 4

GEORG BEHRMANN
Inventor.

Karl F. Ross
AGENT

Inventor:
GEORG BEHRMANN
Karl G. Ross
AGENT

United States Patent Office 3,254,734
Patented June 7, 1966

3,254,734
COLLAPSIBLE AUTOMOTIVE VEHICLE
Georg Behrmann, Katzwang, Kreis Schwabach, Germany, assignor to Zweirad-Union A.G., Nurnberg, Germany, a corporation of Germany
Filed May 16, 1963, Ser. No. 281,003
Claims priority, application Germany, May 19, 1962, 29,423
8 Claims. (Cl. 180—19)

My present invention relates to an automotive vehicle, particularly (though not exclusively) a vehicle for commercial and/or agricultural purposes, and has for its principal object the provision of a vehicle of this type which is collapsible, i.e. whose wheelbase may be substantially reduced for purposes of storage or transportation (e.g. on a flatcar or an overland transporter).

Another object of this invention is to provide a collapsible vehicle which in its normal, operative state can travel over various types of terrain and which can be selectively adapted for the transportation of persons or goods.

A related object of my invention is to provide means in such vehicle for extending the available loading surface beyond an area provided for normal transportation purposes.

It is also an object of the present invention to provide a vehicle of the character referred to which can be conveniently steered in reverse motion, e.g. by a driver walking behind the backward-moving vehicle.

A further object of my instant invention is to provide a vehicle with a self-contained driving unit forming a detachable assembly so as to be useable for purposes other than transporation, e.g., as a power source for agricultural implements or the like.

The invention realizes the foregoing objects, and others that will subsequently appear, in a vehicle having a wheeled and generally dirigible front carriage and a wheeled rear carriage which are hingedly interconnected so as to be swingable from a position of mutual alignment, in which the vehicle has a broad wheelbase and is operable in the usual manner, into a collapsed position in which the rear carriage comes to rest underneath the front carriage, with consequent reduction in the longitudinal extent of the wheelbase. Advantageously, the hinged connection between the two carriages is formed by a transverse axle member on the rear end of a frame forming part of the front carriage, this axle member being preferably tubular to serve as a fuel reservoir for an internal-combustion engine mounted on one of the carriages, generally the rear carriage. In order to be rigidly connectible with the fuel intake of the engine, the tubular axle member may itself be rotatably journaled in the frame of the front carriage and, in use, may be held against rotation by a releasable locking mechanism also serving to maintain the two carriages in their aligned position. In order to afford the necessary resiliency for travel over rough ground, the hinged connection in a preferred embodiment includes an elastic coupling; furthermore, to insure maximum compactness of the vehicle in its collapsed state, I prefer to mount the seats for the driver and any passenger on a detachable platform supported by the frame of the front carriage and to make at least the passenger seat or seats, and/or their back rests, rearwardly swingable to provide an extension of the loading surface formed by the platform. Another optional feature of my invention resides in a tiltable mounting of the steering wheel at the forward end of the front carriage, above the front-wheel assembly, so that this wheel may be selectively inclined into different angular positions for (a) normal driving, (b) backward driving and (c) storage.

These and further features of my invention will become more fully apparent from the following detailed description given with reference to the accompanying drawing in which.

Figure 1:
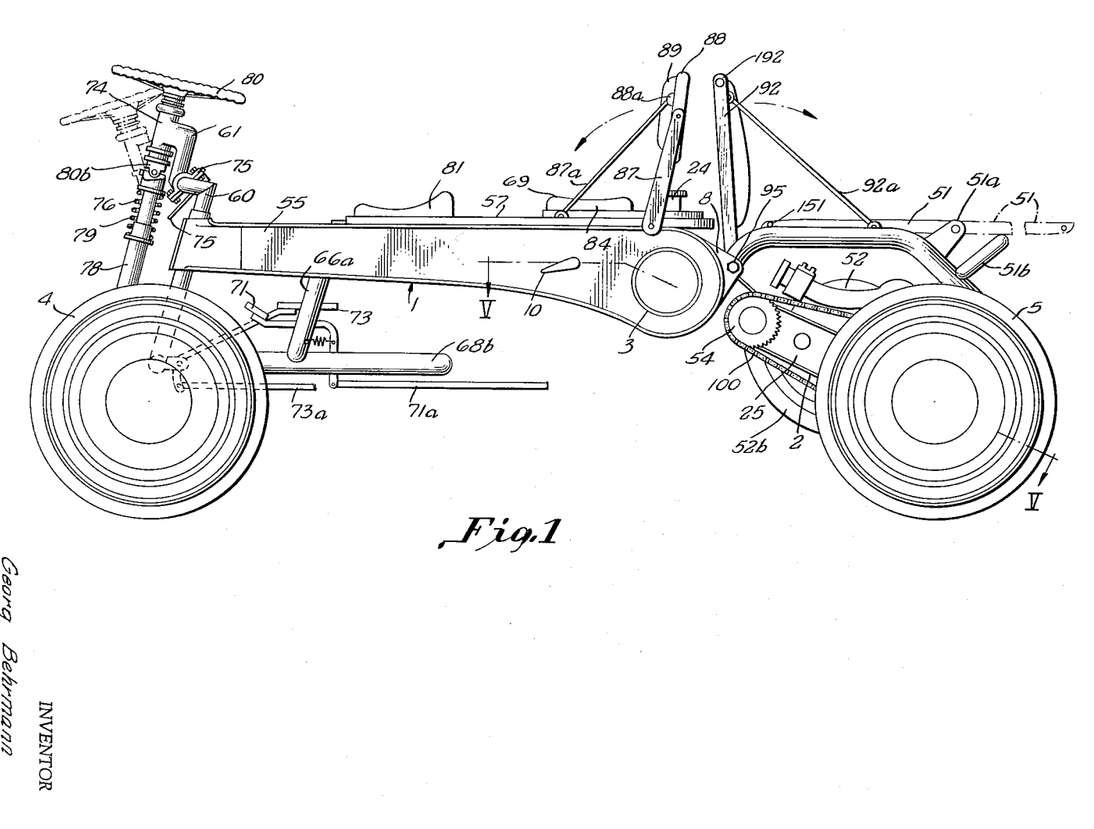
FIG. 1 is a side-elevational view of a vehicle embodying the invention, shown in its operative or extended state.
Figure 2:
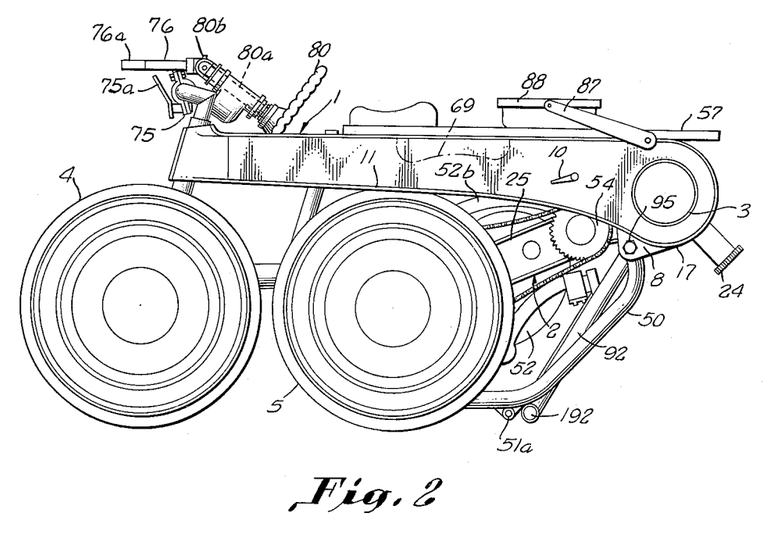
FIG. 2 is a view similar to FIG. 1, showing the vehicle in its collapsed state.
Figure 10:
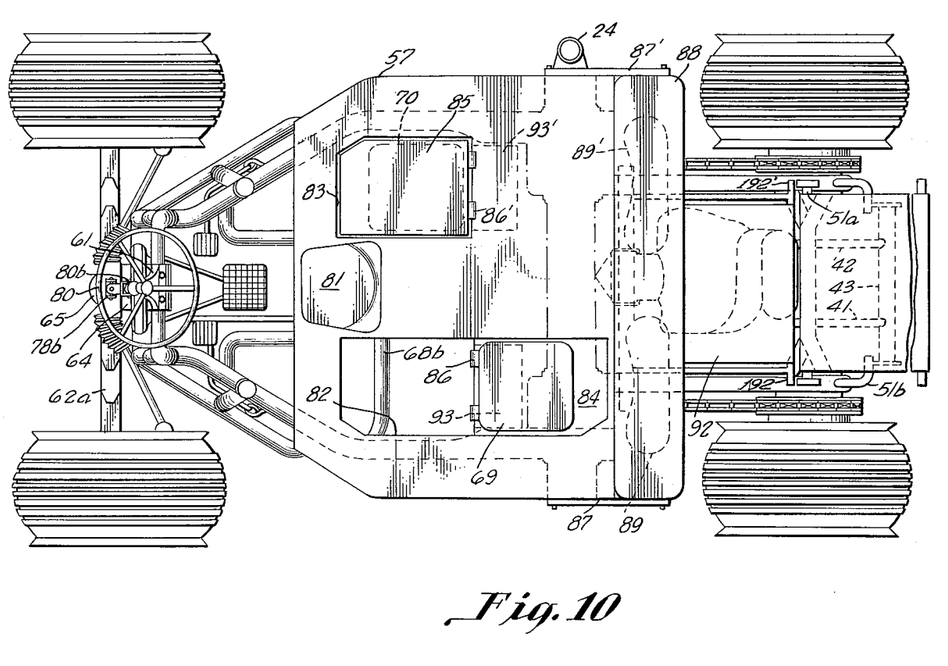
FIG. 10 is a top plan view of the assembled vehicle in the condition thereof illustrated in FIG. 1.

The vehicle shown in the drawing is composed essentially of a front carriage 1 and a rear carriage 2 hingedly interconnected by a transverse tubular axle member 3 so as to be alternately alignable for normal operation, as shown in FIGS. 1 and 10, and collapsible into an inoperative position illustrated in FIG. 2. It will be noted that the front wheels 4, 4' and the rear wheels 5, 5' define a broad wheel base in the first position but are very close together in the second position so that the vehicle then occupies only a minimum of floor space. In the latter position the side bars 55, 56 of the front carriage, which together with axle member 3 constitute a frame, come to rest in the region of their bends 11, 12 on the tires of the rear wheels 5, 5' so as to be effectively cushioned against shocks.

Figure 3:
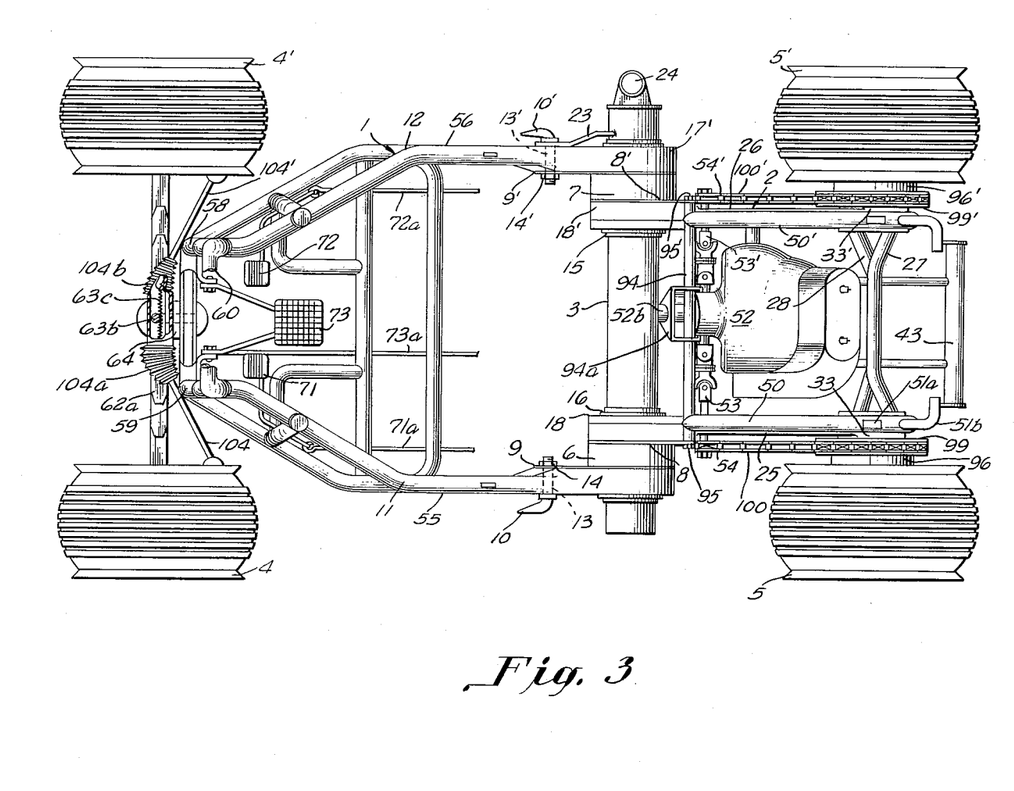
FIG. 3 is a top plan view of the vehicle chassis in its operative state.
Figure 4:
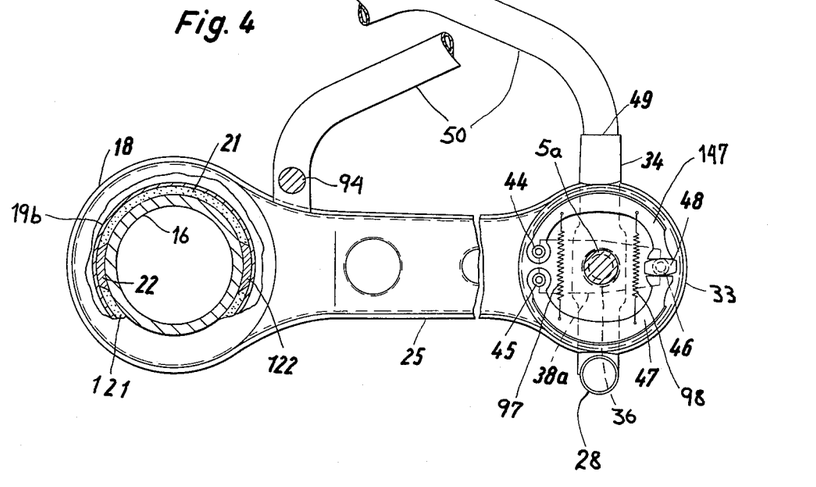
FIG. 4 is a fragmentary side view, partly in section, of the rear carriage of the vehicle.
Figure 5:
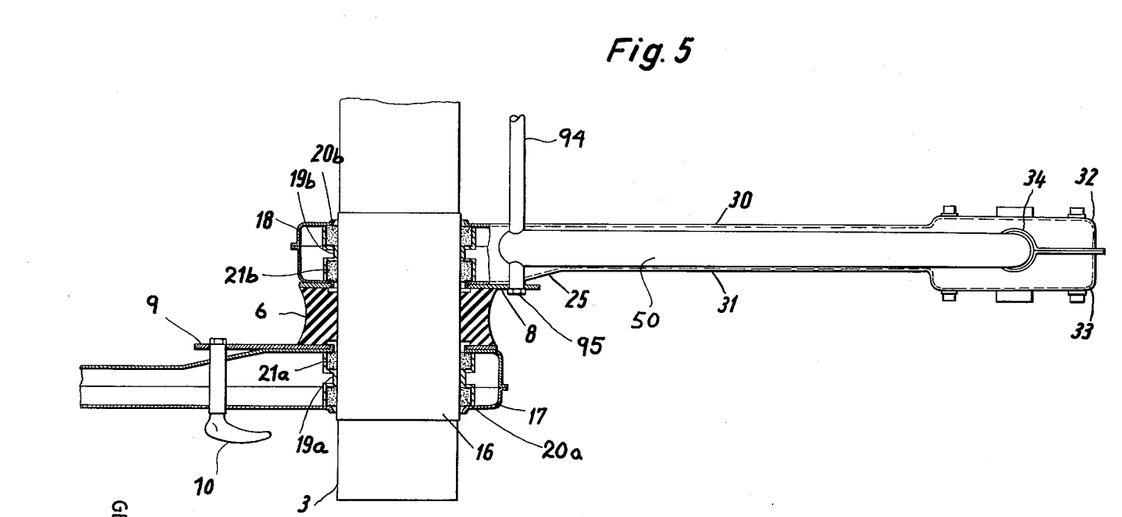
FIG. 5 is an enlarged sectional detail view taken on the line V—V of FIG. 1.

The hinged connection of the two carriages by means of the tube 3 is best illustrated in FIGS. 3–5. Tube 3 has enlarged journal portions 15, 16 embraced by the rear extremities 17, 17' of side bars 55, 56 and by the front ends 18, 18' of arms 25, 26 of the rear carriage, respectively, with interposition of resilient annular coupling elements 6 and 7 of rubber or the like. The coupling rings 6, 7 are provided with radially projecting plates 8, 9 and 8', 9' bonded or otherwise secured to opposite end faces thereof, as best shown for the ring 6 in FIG. 5. A pair of tubular braces 50, 50' extend arcuately above the arms 25, 26 of the rear carriage 2 to which they are rigidly secured; the coupling plates 8, 8' are immobilized with reference to the rear carriage by a rod 94 which traverses the front ends of the braces 50, 50' and has its ends secured to these coupling plates by means of nuts 95, 95'. Their companion plates 9, 9' are releasably attached to the bars 55, 56 with the aid of bolts 13, 13' whose outer ends form handles 10, 10' and whose threaded inner extremities are engaged by nuts 14, 14'; it will be understood that the nuts 14, 14' may be welded onto the bars 55, 56 and that the bolts 13, 13' may be chained or otherwise attached to the frame of the front carriage 1. Bolt 13' also passes through a bore in an arm 23 which is rigid with the axle member 3, the latter being thereby maintained in the position shown in FIGS. 1, 3, 6, 7 and 10 in which an inlet pipe 24 leading to its interior extends upwardly; inlet pipe 24 is provided with a removable cap 24a.

The tube 3 with its journal portions 15, 16 is rotatably supported in the ends 17, 17' of bars 55, 56 and 18, 18' of arms 25, 26, as particularly illustrated for journal portion 16 in FIGS. 4 and 5, with the aid of mounting rings 19a, 19b having a centrally constricted profile. Each of these mounting rings thus forms two annular clearances accommodating respective bearing rings 20a, 21a and 20b, 21b of preferably self-lubricating elastic material; the bearing rings, as shown in FIG. 4 for the ring 21b, are each divided into two segments 21, 121 separated by inserts 22, 122 for more convenient assembly or disassembly. It will be apparent that these bearing rings, particularly those in the ends 17 and 17', also serve as resilient cushions designed to absorb the flexural stresses exerted upon the connecting tube 3 during yawing motion of the dirigible front carriage.

Figure 9:
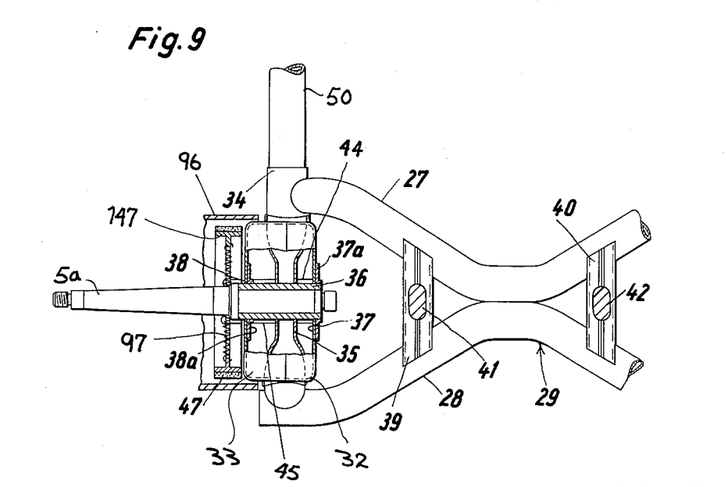
FIG. 9 is a detail view, partly in section and drawn to a larger scale, of some of the elements visible in FIG. 7.

The arms 25 and 26 of the rear carriage each consists, as particularly illustrated for the arm 25, of two longitudinally extending helf-shells 30, 31 terminating at the rear in respective enlargements 32, 33. These enlargements, as seen in FIG. 9, are axially interconnected by a tube 46 supporting the axle 5a of the associated rear wheel 5. Tube 36 is supported by a pipe 34 which passes vertically through the axle housing constituted by the parts 32, 33 and which is flattened to receive the tube 36. The latter is also secured, e.g. by welding, to the faces 37, 38 of the end portions 32, 33 which are centrally reinforced by sheet-metal disks 37a and 38a.

Figure 7:
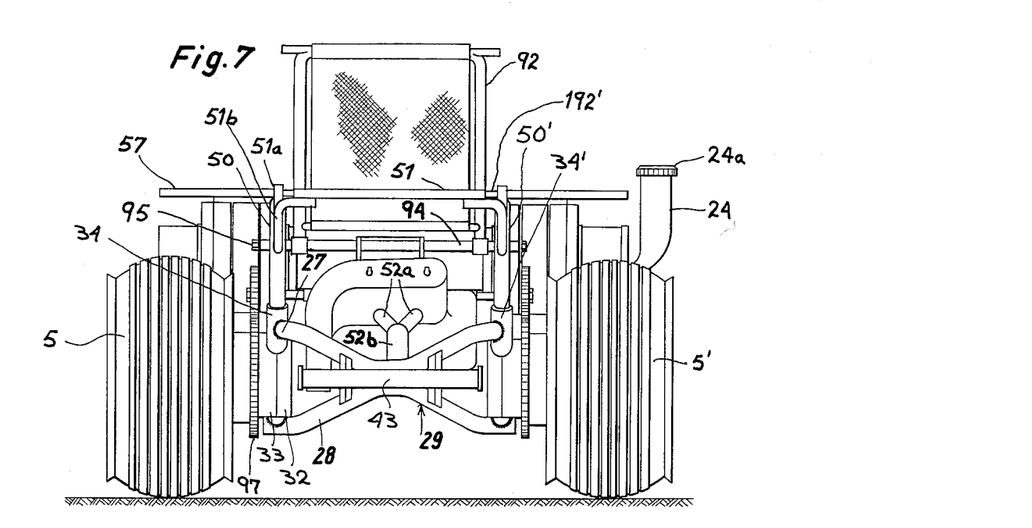
FIG. 7 is a rear view of the vehicle in its operative stage.

The vertical pipe 34 of arm 25 and its companion pipe 34' are interconnected, as best seen in FIG. 7, by a pair of cross-braces 27, 28 together constituting a figure-X-shaped yoke structure 29 (see FIGS. 7 and 9). These cross-braces 27, 28 contact each other at the center and are additionally interconnected, on opposite sides of their junction point, by vertical struts 39, 40 of box-type profile. The struts 39, 40 are traversed by horizontal bars 41, 42 which extend rearwardly to carry a bumper 43 and whose front ends help support the engine 52 of the vehicle. This engine, here shown as a two-cylinder unit of the type used in motorcycles, is provided with twin intakes 52a from which a supply pipe 52b extends forwardly to connect with the interior of axle tube 3 serving as a fuel tank for the engine. The front end of pipe 52b is suspended by a bracket 94a which depends from the rod 94 and serves as a further engine support.

Two brake housings 96, 96' partly envelop the portions 33, 33' of the rear-axle housing which are traversed in axial direction, as illustrated in FIG. 4 for the axle housing 32, 33 on arm 25, by three bolts 44, 45 and 46. Bolts 44, 45 are the pivots of respective brake shoes 47, 147 that are biased toward each other, and thus away from the inner periphery of brake housing 96, by contractile springs 97, 98. A cam 48 on bolt 46 is operable in the known manner to spread the brake shoes into frictional engagement with the surrounding housing wall. This arrangement eliminates the need for a separate brake drum.

The upper ends 49 (FIG. 4) of pipes 34 and 34' receive the rear extremities of the braces 50, 50' whereby the latter are rigidly connected with the yoke 29 and the arms 25, 26 to constiue the rear carriage 2. The braces 50, 50', in addition to strengthening the rear carriage and supporting other parts of the assembly, also act as guard members for the engine 52 in both the operative state (FIG. 1) and the collapsed state (FIG. 2) of the vehicle.

The engine 52 powers a pair of articulated drive shafts 53, 53' carrying sprocket wheels 54, 54' which in turn are linked with other sprocket wheels 99, 99' on the rear-wheel axles via transmission chains 100 and 100'. It will be understood that the transmission ratio can be readily adapted to different terrains by a change of sprocket wheels.

Figure 6:
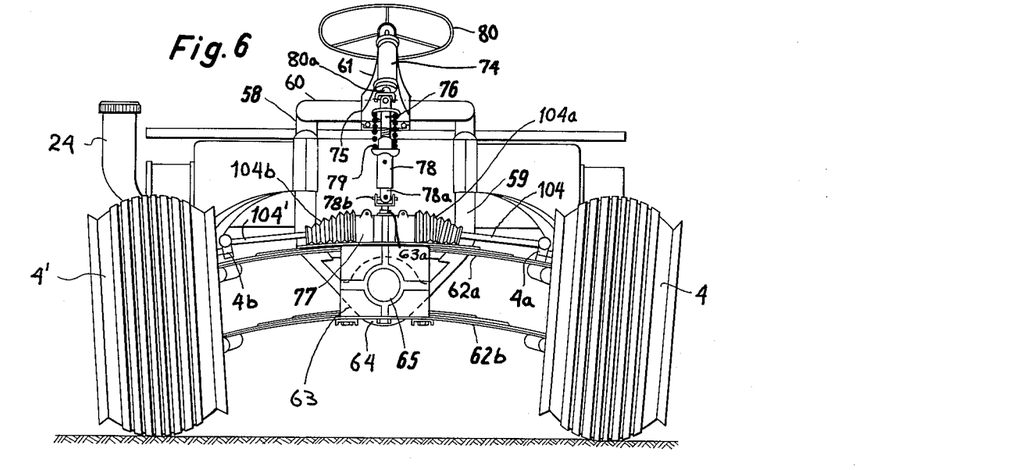
FIG. 6 is a front view of the vehicle in its operative state.
Figure 8:
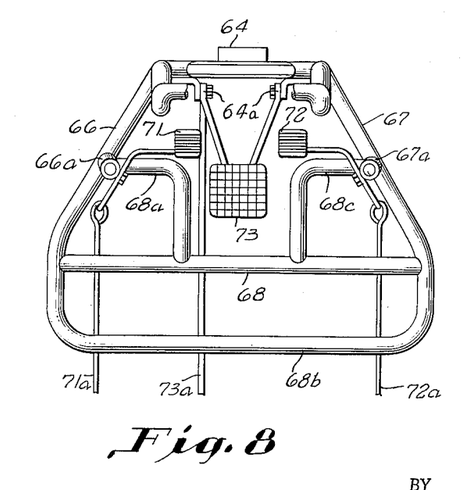
FIG. 8 is a top view of a supporting structure forming part of the front carriage of the vehicle.

The construction of the front carriage 1 will now be described with specific reference to FIGS. 6 and 8. The side bars 55, 56 of this front carriage converge forwardly and support a loading platform 57 (FIGS. 1, 2 and 10) removably resting thereon; the front edge of this platform lies just slightly forwardly of the bends 11, 12 so as to be separated by a relatively large space from the front-wheel assembly at the forward end of carriage 1. This front-wheel assembly includes two sets of laminated springs 62a, 62b centrally interconnected by a block 63. The block 63 is journaled on a preferably tubular bearing stud 65 projecting forwardly from a hub 64 which is rigidly suspended from the frame of the front carriage by vertical struts 58, 59 integral with the front ends of bars 55, 56. The tops of struts 58 and 59 are bridged by a crossbar 60 to which an upstanding brace 61 is adjustably secured by a clamp 75. The upper end of brace 61 is rigid with a bearing 74 in which is journaled a stem 80a of a steering wheel 80. A universal joint 80b links the stem 80a with a dependent rod 76, having a square-shaped or otherwise profiled extremity 76a, which, together with a coupling sleeve 78 and a lower rod 78a of a similar profile, constitutes a steering column. Sleeve 78, telescopically mating with rods 76 and 78a, is rectractable on rod 76 against the force of an expanding coil spring 79 so as to disengage the rod 78a from rod 76, thereby enabling the steering column to be disassembled for removal of rod 76 into an inoperative position (illustrated in FIG. 2) in which the wheel 80 is partly received in the frame of the front carriage 1 and the rod 76 extends substantially horizontally. The clamp 75, which of course must be loosened and retightened in order to bring about the position of FIG. 2, may also be adjusted to let the wheel 80 face forwardly at an inclination substantially opposite its normal rearward inclination, as has been illustrated in dot-dash lines in FIG. 1. This alternate forward position, in which the universal joint 80b still permits the steering column to be turned under the control of wheel 80, facilitates steering of the backward-moving vehicle by a driver walking behind it.

The lower rod 78a of the steering column is connected via another universal joint 78b with a post 63a rising vertically from the block 63. Post 63a carries a pinion 63b (FIG. 3) meshing with a rack 63c whose ends are linked with a pair of rods 104, 104' that are articulated in the usual manner to the steering knuckles 4a, 4b of the front wheels 4. Rods 104, 104' are partly enveloped by flexible bellows 104a, 104b enabling the entire front-wheel assembly to flex with the springs 62a, 62b and to swivel about the journal stud 65.

During normal forward motion of the vehicle, the driver occupies a seat 81 positioned centrally on the platform 57 near the front edge thereof. A lower frame including a pair of rearwardly diverging side arms 66, 67, a main crossbar 68 and an auxiliary crossbar 68b extends underneath the main-frame members 55, 56 of the front carriage and is rigidly secured to the hub 64 by the front ends of its arms 66, 67, these arms being further connected with the members 55, 56 via nearly vertical columns 66a, 67a. Pivoted to these columns are a pair of driver-controlled pedals 71, 72 while a further pedal 73 is hinged at 64a to the hub 64; the centrally positioned pedal 73 is located between elbows 68a, 68c which also form part of the lower frame and serve as footrests for the driver. Pedal 73 is a brake pedal connected via a suitable linkage 73a, not illustrated in detail, with the actuating bolts 46 (FIG. 4) for the brake cams 48; pedals 71 and 72 are similarly connected by linkages 71a, 72a with the clutch and accelerator controls associated with engine 52. The linkages 71a, 72a are normally held taut by tension springs; linkage 73a is tensioned by the restoring springs 97, 98 of the brake assembly (FIG. 4).

In addition to the driver's seat 81, platform 57 also carries two passenger seats 69, 70 in the form of pads on a pair of hinged lids 84, 85. Platform 57 has two elongated cutouts 82, 83 which are closable by the lids 84, 85 when the latter are swung about their hinges 86, 86' from their open position, illustrated in FIG. 10 for the lid 84, into their closed position shown in that figure for the lid 85; in the position of closure the pads 69, 70 face downwardly within the cutouts 82, 83. The crossbar 68b of the lower frame extends below the cutouts 82, 83 so as to constitute a footrest for persons seated on the pads 69, 70. These persons can also lean against a back rest 88 which is hinged to the platform 57 via arms 87, 87' and which is provided with a pair of cushions 89, 89' for the backs of the passengers. The arms 87, 87' are normally held for this purpose in their upstanding position (FIG. 1) by a pair of stays 87a hooked into lugs 88a. When these stays are disconnected from the platform or at least from the back rest 88, the arms 87, 87' can swing clockwise or counterclockwise so that the back rest 88 comes to lie either on the platform 57, just behind the driver's seat 81, or immediately behind that platform on the braces 50, 50' of the rear carriage to form a platform extension as illustrated in FIG. 10; in these lowered positions the cushions 89, 89' advantageously are turned to face downwardly (FIGS. 2 and 10).

A further passenger seat 51 is hinged to the braces 50, 50' at 51a and accommodates a person facing backward during forward motion of the vehicle, this person resting his feet on the bumper bar 43 and leaning against a back rest 92 hinged to the structure of the rear carriage by the rod 94 thereof; stays 92a hold the back rest 92 in its upright position (FIG. 1) but may be decoupled therefrom so that the back rest 92 folds rearwardly into the carriage 2 and, with a pair of projections 192, 192', comes to rest against the braces 50, 50'. Preparatorily to this, seat 51 will have to be swung out rearwardly into a position shown in dot-dash lines in FIG. 1 to form another rearward extension of platform 57; in this reversed position the seat 51 comes to rest on a pair of lugs 51b which project from braces 50, 50' and which may also serve as hand grips for a rider standing on the bumper bar 43. Seat 51 may, however, also be entirely removed from the vehicle (e.g. by withdrawal of its pivot pins), especially when the latter is to be collapsed into the position shown in FIG. 2. Seat 51 has projections 151 for supporting its front end on the braces 50, 50' in the position of FIG. 1.

It will thus be seen that I have provided a highly versatile vehicular structure which will conveniently accommodate a driver and at least three passengers or which can support loads of various sizes, its loading area being extensible rearwardly by the hinged members 88, 92 and 51. If the vehicle is operated backwards by a driver walking behind it, as described with reference to the steering-wheel position shown in dot-dash lines in FIG. 1, even the area in the immediate vicinity of driver's seat 81 (which in this case could also be removed) becomes available for loading. It will be understood that for the last-mentioned mode of operation the vehicle may be provided with manual levers, not shown, that are coupled to the pedal linkages 71a, 72a, 73a in order to enable convenient control of throttle, clutch and brake when the engine drive has been thrown into reverse by the usual shift lever (likewise not shown).

The illustrated arrangement of the passenger seats 69, 70 behind the driver's seat 81 and close to the lateral edges of platform 57 makes it easy for all the riders to mount and leave the vehicle without getting in one another's way. Platform 57 may, in addition, carry tools and other equipment and is for this purpose shown provided on its underside with drawers 93, 93'. Clamp 75 is shown equipped with the handle 75a which may be permanently attached to it to serve as a wrench in the loosening and tightening thereof.

Modifications of the specific construction described and illustrated are, of course possible without departing from the spirit and scope of the invention as defined in the appended claims.

I claim:

1. An automotive vehicle comprising a wheeled front carriage, a rear carriage provided with an internal-combustion engine and wheels powered by said engine, an elongated tubular axle member horizontally extending across the rear of said front carriage, said rear carriage being swingably secured to said axle member for relative rotation about a horizontal axis, the interior of said axle member being connected with said engine and constituting a fuel reservoir therefor, and releasable locking means for maintaining said carriages in an aligned position with said wheels disposed rearwardly of said axis, said rear carriage being forwardly swingable into a collapsed position underneath said front carriage upon release of said locking means, said wheels lying forwardly of said axis in said collapsed position.

2. An automotive vehicle comprising a front carriage with a dirigible front-wheel assembly and a horizontal frame extending rearwardly from said assembly, said frame terminating in a transverse axle member; a rear carriage provided with an engine, a pair of driven wheels coupled with said engine and a pair of side arms extending forwardly from said wheels into swingable engagement with said axle member for relative rotation of said carriages about a horizontal axis; steering means for said assembly on said front carriage; releasable locking means for maintaining said carriages in an aligned position in which said wheels are disposed rearwardly of said axle member, said rear carriage being forwardly swingable upon release of said locking means into a collapsed position underneath said frame with said wheels lying forwardly of said axle member; a supporting platform removably carried on said frame, said platform having a front edge spaced rearwardly from said front-wheel assembly; a driver's seat on said platform adjacent said front edge; and a supporting structure on said front carriage below said platform, said structure forming a footrest for the driver and being provided with pedal means within reach of the driver's feet for controlling the operation of the vehicle, said platform being provided with at least one cutout and a cover therefor hingedly secured to said platform behind said cutout, said cover being swingable between an open and a closed position, said cover being provided with a passenger seat facing downwardly within said cutout in said closed position and facing upwardly behind said cutout in said open position, said structure extending rearwardly below said cutout, thereby forming a footrest for a person occupying said passenger seat.

3. An automotive vehicle comprising a front carriage with a dirigible front-wheel assembly and a horizontal frame extending rearwardly from said assembly, said frame terminating in a transverse axle member; a rear carriage provided with an engine, a pair of driven wheels coupled with said engine and a pair of side arms extending forwardly from said wheels into swingable engagement with said axle member for relative rotation of said carriages about a horizontal axis; steering means for said assembly on said front carriage; releasable locking means for maintaining said carriages in an aligned position in which said wheels are disposed rearwardly of said axle member, said rear carriage being forwardly swingable upon release of said locking means into a collapsed position underneath said frame with said wheels lying forwardly of said axle member; a supporting platform removably carried on said frame, said platform having a front edge spaced rearwardly from said front-wheel assembly; a driver's seat on said platform adjacent said front edge; and a supporting structure on said front carriage below said platform, said structure forming a footrest for the driver and being provided with pedal means within reach of the driver's feet for controlling the operation of the vehicle, said platform being provided with at least one cutout and a cover therefor hingedly secured to said platform behind said cutout, said cover being swingable between an open and a closed position, said cover being provided with a passenger seat facing downwardly within said cutout in said closed position and facing upwardly behind said cutout in said open position, said vehicle, further comprising a back rest swingably secured to said platform and releasable detent means for holding back said back rest in a rearwardly inclined position behind said passenger seat, said back rest being rearwardly tiltable into a substantially horizontal position above said rear carriage for constituting a rearward extension of said platform.

4. An automotive vehicle comprising a front carriage with a dirigible front-wheel assembly and a horizontal frame extending rearwardly from said assembly, said frame terminating in a transverse axle member; a rear carriage provided with an engine, a pair of driven wheels coupled with said engine and a pair of side arms extending forwardly from said wheels into swingable engagement with said axle member for relative rotation of said carriages about a horizontal axis; steering means for said assembly on said front carriage; releasable locking means for maintaining said carriages in an aligned position in which said wheels are disposed rearwardly of said axle member, said rear carriage being forwardly swingable upon release of said locking means into a collapsed position underneath said frame with said wheels lying forwardly of said axle member, said rear carriage being provided with a backward-facing rear seat above said wheels, said rear seat being rearwardly swingable through substantially 180° into an alternate position projecting beyond said rear carriage on the level of said platform for constituting a rearward extension of the latter.

5. A vehicle as defined in claim 4 wherein said rear seat is provided with a back rest having detent means for releasably holding it in a forwardly inclined position, said back rest being hinged to said rear carriage and being swingable into a substantially horizontal position on the level of said platform for constituting a rearward extension of the latter.

6. An automotive vehicle comprising a front carriage with a dirigible front-wheel assembly and a horizontal frame extending rearwardly from said assembly, said frame terminating in a transverse axle member; a rear carriage provided with an engine, a pair of driven wheels coupled with said engine and a pair of side arms extending forwardly from said wheels into swingable engagement with said axle member for relative rotation of said carriages about a horizontal axis; steering means for said assembly on said front carriage; releasable locking means for maintaining said carriages in an aligned position in which said wheels are disposed rearwardly of said axle member, said rear carriage being forwrdly swingable upon release of said locking means into a collapsed position underneath said frame with said wheels lying forwardly of said axle member; said steering means including a steering column rising with a rearward inclination from said front-wheel assembly, a steering wheel having a stem articulated to said column, and retaining means on said frame engaging said stem with freedom of relative rotation, said retaining means being adjustable for selectively holding said stem in one of several angular positions relative to said column, said angular positions including a first position in which said stem is substantially aligned with said column, a second position in which said stem extends inclinedly forwardly from its junction with said column, and a third position in which said stem is tilted back in a direction generally perpendicular to said column, said steering wheel being partly received in said frame in said third position, said stem being telescopically coupled with said column, the latter having a spring-loaded top portion which is downwardly retractable against its spring force for disengagement from said stem preparatorily to movement thereof into said third position.

7. An automotive vehicle comprising a front carriage with a dirigible front-wheel assembly and a horizontal frame extending rearwardly from said assembly, said frame including a pair of rearwardly extending side bars and a transverse tubular axle member provided with an inlet for liquid fuel, said member being rotatably journaled in the rear extremities of said side bars; a rear carriage provided with an internal-combustion engine having a fuel intake connected with the interior of said member, a pair of driven wheels coupled with said engine and a pair of side arms extending forwardly from said wheels into swingable engagement with said axle member for relative rotation of said carriage about a horizontal axis; steering means for said assembly on said front carriage; a resilient coupling ring secured to each of said arms and surrounding said axle member; and releasable locking means on said frame engaging said coupling rings for elastically maintaining said carriages in an aligned position in which said wheels are disposed rearwardly of said axle member, said rear carriage being forwardly swingable upon release of said locking means into a collapsed position underneath said frame with said wheels lying forwardly of said axle member in contact with said frame, said member being maintained by said locking means in a predetermined rotary position relative to said front carriage.

8. An automotive vehicle comprising a front carriage having at least two front wheels; a rear carriage having at least two rear wheels, each lying in a common vertical plane with one of said front wheels; hinge means interconnecting said carriages and enabling said rear carriage to be swung into a collapsed position underneath said front carriage; releasable locking means located on said front carriage for maintaining said rear carriage in an aligned position to the rear of said hinge means, said rear carriage being forwardly swingable upon release of said locking means into said collapsed position with said rear wheels disposed forwardly of said hinge means, said hinge means being located above a plane extending through the axes of said front and rear wheels in all positions thereof at a horizontal distance from said front wheels greater than the distance from said hinge means to the rotation axis of said rear wheels plus the radius thereof, said front and rear carriages defining a substantially continuous flat bed parallel to said plane and extending from said rear wheels to said front wheels in said aligned position, said front carriage defining a flat bed parallel to said plane in said collapsed position.

References Cited by the Examiner

UNITED STATES PATENTS

| | | | |
|---|---|---|---|
| 1,364,280 | 1/1921 | Isreal. | |
| 1,677,419 | 7/1928 | Wagner | 280—87 |
| 2,260,102 | 10/1941 | Freret | 280—87 X |
| 2,457,400 | 12/1948 | Ross. | |
| 2,502,061 | 3/1950 | Radford | 296—69 X |
| 2,974,973 | 3/1961 | Muhleck | 280—87 |
| 3,004,619 | 10/1961 | Straussler | 180—27 |

FOREIGN PATENTS

| | | |
|---|---|---|
| 528,354 | 8/1921 | France. |
| 1,048,114 | 7/1953 | France. |

BENJAMIN HERSH, *Primary Examiner.*

A. HARRY LEVY, *Examiner.*

M. L. SMITH, *Assistant Examiner.*